(12) United States Patent
Ootaka

(10) Patent No.: US 8,244,436 B2
(45) Date of Patent: Aug. 14, 2012

(54) OCCUPANT DETECTION APPARATUS

(75) Inventor: Kouji Ootaka, Toyohashi (JP)

(73) Assignee: Denso Corporation, Kariya (JP)

( * ) Notice: Subject to any disclaimer, the term of this patent is extended or adjusted under 35 U.S.C. 154(b) by 337 days.

(21) Appl. No.: 12/800,883

(22) Filed: May 25, 2010

(65) Prior Publication Data

US 2010/0305817 A1 Dec. 2, 2010

(30) Foreign Application Priority Data

May 28, 2009 (JP) ................................. 2009-129463

(51) Int. Cl.
*B60R 22/00* (2006.01)
(52) U.S. Cl. .......................................... 701/45; 701/49
(58) Field of Classification Search ..................... 701/45, 701/49
See application file for complete search history.

(56) References Cited

U.S. PATENT DOCUMENTS

| | | | |
|---|---|---|---|
| 6,517,106 | B1 | 2/2003 | Stanley et al. |
| 6,520,535 | B1 | 2/2003 | Stanley et al. |
| 8,140,224 | B2 * | 3/2012 | Shimizu et al. ................. 701/45 |
| 2006/0069509 | A1 | 3/2006 | Hayasaka |
| 2006/0217862 | A1 | 9/2006 | Sakai et al. |
| 2008/0109138 | A1 | 5/2008 | Shimizu et al. |
| 2008/0243343 | A1 | 10/2008 | Kumagai et al. |

FOREIGN PATENT DOCUMENTS

| | | |
|---|---|---|
| JP | 11-268579 | 10/1999 |
| JP | 2006-088916 | 4/2006 |
| JP | 2006-264366 | 10/2006 |
| JP | 2006-298108 | 11/2006 |
| JP | 2008-137637 | 6/2008 |
| JP | 2008-247277 | 10/2008 |

OTHER PUBLICATIONS

Office action dated May 6, 2011 in corresponding Japanese Application No. 2009-129463.

* cited by examiner

*Primary Examiner* — Thomas Tarcza
*Assistant Examiner* — Tyler J Lee
(74) *Attorney, Agent, or Firm* — Harness, Dickey & Pierce, PLC

(57) ABSTRACT

An occupant detection apparatus for a vehicle is disclosed. The occupant detection apparatus includes a buckle switch, a seat position sensor and an electronic control unit. The electronic control unit includes a first active element and a second active element that respectively control energization of the buckle switch and the seat position sensor. The electric control unit performs on-off control on the first active element in such manner that: the first active element is held on for a predetermined period; and at a time of an end of the predetermined period, the first active element is switched off and the second active element is switched on. The occupant detection apparatus can reduce radio noise generated due to the energization of the buckle switch and the seat position sensor, and can minimize an influence of the radio noise on another electronic apparatus mounted in the vehicle.

3 Claims, 3 Drawing Sheets

| BUCKLE SWITCH | | | | | |
|---|---|---|---|---|---|
| | UNFASTENED | | FASTENED | | |
| | MIN | MAX | MIN | MAX | UNIT |
| IccB | 4.0 | 7.0 | 12.0 | 18.0 | mA |

| SEAT POS. SENSOR | | | | | |
|---|---|---|---|---|---|
| | FRONT MOST | | REAR MOST | | |
| | MIN | MAX | MIN | MAX | UNIT |
| IccS | 4.7 | 7.3 | 11.4 | 17.9 | mA | ical technique involves the following difficulty.

OCCUPANT DETECTION APPARATUS

CROSS REFERENCE TO RELATED APPLICATION

The present application is based on Japanese Patent Application No. 2009-129463 filed on May 28, 2009, disclosure of which is incorporated herein by reference.

BACKGROUND OF THE INVENTION

1. Field of the Invention

The present invention relates to an occupant detection apparatus including a buckle switch, a seat position sensor, and an occupant detection electronic control unit.

2. Description of Related Art

A modern vehicle is equipped with an occupant detection apparatus. A typical occupant detection apparatus includes a main electrode, an electrostatic sensor, and an, occupant detection electronic control unit (ECU). The main electrode is arranged inside a seat. The electrostatic sensor is connected with the occupant detection ECU and is configured to output a current or a voltage indicative of disturbance of weak electric field, which is generated between the main electrode and a vehicle body. A typical occupant detection apparatus further includes a buckle switch for detecting whether a seat belt is fastened or unfastened, and a seat position sensor for detecting a position of the seat along a front-rear direction. The buckle switch and the seat position sensor are connected with the occupant detection ECU.

JP-2006-88916A corresponding to US Patent Application Publication 2006/0069509 discloses a vehicular collision determination apparatus in which a buckle switch and a seat position sensor are connected with an occupant detection ECU. The collision determination apparatus determines an occurrence of vehicle collision in order to activate, for example, an occupant protection apparatus such as an airbag, a seatbelt pretensioner and the like. The collision determination apparatus sets a collision determination threshold by referencing a determination result regarding whether the seat belt is fastened or unfastened, and a determination result regarding whether the seat is in a front position or a rear position.

The inventor of the present application has found that a conventional technique involves the following difficulty. According to JP-2006-88916A (which corresponds to US Patent Application Publication 2006/0069509), in response to start of the vehicle through key operation, both of the buckle switch and the seat position sensor are placed in continuous operation, and a large operating current flows in the occupant detection ECU via the buckle switch and the seat position sensor. In order to reduce power consumption due to the operating current, the occupant detection ECU controls both of the buckle switch and the seat position sensor so that the both sensors are intermittently energized. However, when the occupant detection ECU causes the both sensors to be intermittently energized, a radio noise is generated from the occupant detection ECU. This radio noise causes a negative influence on another electronic apparatus mounted in the vehicle.

SUMMARY OF THE INVENTION

In view of the above and other difficulties, it is an objective of the present invention to provide an occupant detection apparatus for a vehicle, the occupant detection apparatus being capable of reducing radio noise generation caused by intermittent energization of a buckle switch and a seat position sensor, and thereby minimizing a negative influence of the radio noise on another electronic apparatus mounted in a vehicle.

According to a first aspect of the present invention, an occupant detection apparatus for a vehicle is provided. The occupant detection apparatus includes a buckle switch, a seat position sensor and an electronic control unit. The buckle switch is configured to detect whether a seatbelt of the vehicle is fastened or unfastened. The seat position sensor is configured to detect position of a seat of the vehicle, wherein the seat is selectively movable frontward and rearward. The electronic control unit includes an energization control part and a computation control part. The energization control part includes: a first active element that is selectively switchable into an on state and an off state to control energization of the buckle switch so that the buckle switch is energized when the first active element is in the on state, and the buckle switch is unenergized when the first active element is in the off state; and a second active element that is selectively switchable into an on state and an off state to control energization of the seat position sensor so that the seat position sensor is energized when the second active element is in the on state, and the seat position sensor is unenergized when the second active element is in the off state. The computation control part is configured to perform on-off control individually on the first active element and the second active element by (i) applying a first voltage to the first active element to and (ii) applying a second voltage to the second active element; in such manner that: the computation control part causes the first active element to be in the on state for a predetermined period; and at a time of an end of the predetermined period, the computation control part twitches the first active element into the off state and switches the second active element into the on state.

According to the above occupant detection apparatus, the energization of the buckle switch and the energization of the seat position sensor have time continuity therebetween. Thus, it is possible to minimize a change in conduction current flowing in the electronic control unit. It is therefore possible to reduce generation of radio noise, and it is possible to minimize a negative influence of the radio noise on another electronic apparatus mounted in the vehicle.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE EXEMPLARY EMBODIMENTS

Figures 1, 2A, 2B:
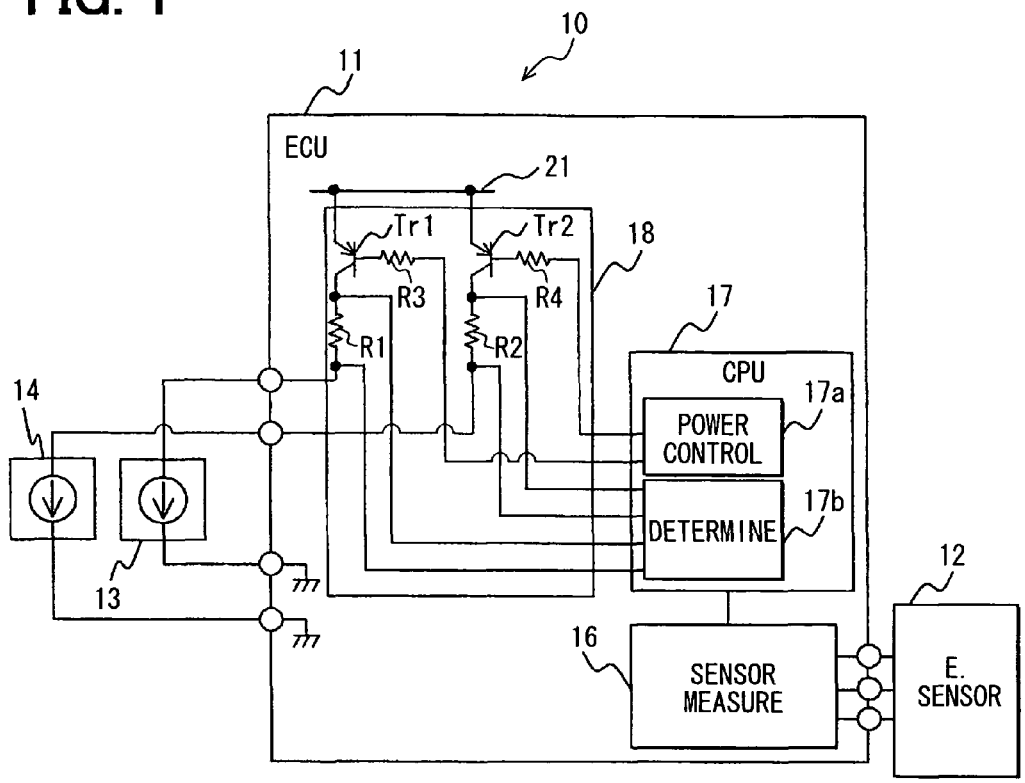
FIG. 1 is a block diagram illustrating an occupant detection apparatus according to one embodiment.
FIG. 2A is a diagram illustrating a relationship between a buckle switch state and a conduction current according to one embodiment.
FIG. 2B is a diagram illustrating a relationship between a seat position and a conduction current according to one embodiment.

The exemplary embodiments will be illustrated below with reference to the accompanying drawings.

The exemplary embodiments are illustrated below with reference to the accompanying drawings. In the following description, like reference numerals are used to refer to like parts.

FIG. 1 is a block diagram illustrating an occupant detection apparatus 10 according to one embodiment.

The occupant detection apparatus 10 includes an occupant detection electronic control unit (ECU) 11, an electrostatic sensor 12, a buckle switch 13 and a seat position sensor 14. The devices 12, 13 and 14 are connected with the occupant detection ECU 11. The electrostatic sensor 12 detects disturbance of a weak electric field generated between a main electrode, which is arranged inside a seat (not shown), and a vehicle body. The electrostatic sensor 12 outputs an electric current or voltage indicative of the detected disturbance. The buckle switch 13 detects or determines whether a seat belt (not shown) is fastened or unfastened. The seat position sensor 14 detects position of the seat between a front position and a rear position.

The occupant detection ECU 11 includes a sensor characteristic measurement part 16, and a CPU (Central Processing Unit) 17 and an energization control part 18. The CPU 17 includes a power supply control section 17a and a determination section 17b, and can act as a computation control part or means. The sensor characteristic measurement part 16 measures electrostatic capacitance of a measurement target object based on the electric current or voltage outputted from the electrostatic sensor. The measurement target object is, for example, an occupant sitting down on the seat, or the like. Based on the measured electrostatic capacitance, the CPU 17 determines a type of the occupant or the like.

The energization control part 18 includes a first transistor Tr1, a second transistor Tr2, a first resistor R1 and a second resistor R2. The first transistor Tr1 is used for energization and operation of the buckle switch 13, and can act as a first active element. The second transistor Tr2 is used for energization of the seat position sensor 14, and can act as a second active element. Emitters of the first and second transistors Tr1 and Tr2 are connected with a power supply line 21 of a DC (direct current) power supply (not shown). A collector of the first transistor Tr1 is connected with the resistor R1. A collector of the second transistor Tr1 is connected with the second resistor R2. Via the first resistor R1, the collector of the first transistor Tr1 is connected with a power input terminal of the buckle switch 13. Via the second resistor R2, the collector of the second transistor Tr2 is connected with a power input terminal of the seat position sensor 14. A ground terminal of each of the buckle switch 13 and the seat position sensor 14 is grounded. A gate terminal of the first transistor Tr1 is connected with the power supply control section 17a via a third resistor R3. A gate terminal of the second transistor Tr2 is connected with the power supply control section 17a via a fourth resistor R4. Both ends of the first resistor R1 are connected with the determination section 17b, and both ends of the second resistor R2 are connected with the determination section 17b.

According to the above configuration, when the power supply control section 17a switches the first transistor Tr1 into an on state, a current flows to the buckle switch 13 via the first resistor R1. In this case, the determination section 17b detects a conduction current IccB flowing across the both ends of the first resistor R1, and thereby determines whether the seatbelt is fastened or unfastened. For example, as shown in FIG. 2A, when the seatbelt is unfastened, the conduction current IccB is 4.0 mA at minimum and 7.0 mA at maximum. Thus, when the conduction current IccB in a range between 4.0 mA and 7.0 mA is detected, the determination section 17b determines that the seatbelt is unfastened. By contract, when the seatbelt is fastened, the conduction current IccB is 12.0 mA at minimum and 18.0 mA at maximum. Thus, when the conduction current IccB in a range between the 12.0 mA and 18.0 mA is detected, the determination section 17b determines that the seatbelt is fastened.

When the power supply control section 17a switches the second transistor Tr2 into an on state, a current flows to the seat position, sensor 14 via the second resistor R2. In this case, the determination section 17b detects a conduction current IccS flowing across the both end of the second resistor R2, and thereby determines which position the seat is in along a front-rear direction. For example, as shown in FIG. 2B, when the seat is in a frontmost position where the seat is positioned at the frontmost in a predetermined movable range, the conduction current IccS is 4.7 mA at minimum and 7.3 mA at maximum. Thus, when the conduction current IccS in a range between 4.7 mA and 7.3 mA is detected, the determination section 17b determines that the seat is positioned at the foremost. By contract, when the seat is in a rearmost position where the seat is positioned at the rearmost in the predetermined movable range, the conduction current IccS is 11.4 mA at minimum and 17.9 at maximum. Thus, when the conduction current in a range between 11.4 mA to 17.9 mA is detected, the determination section 17b determines that the seat is positioned at the rearmost.

Figure 3:
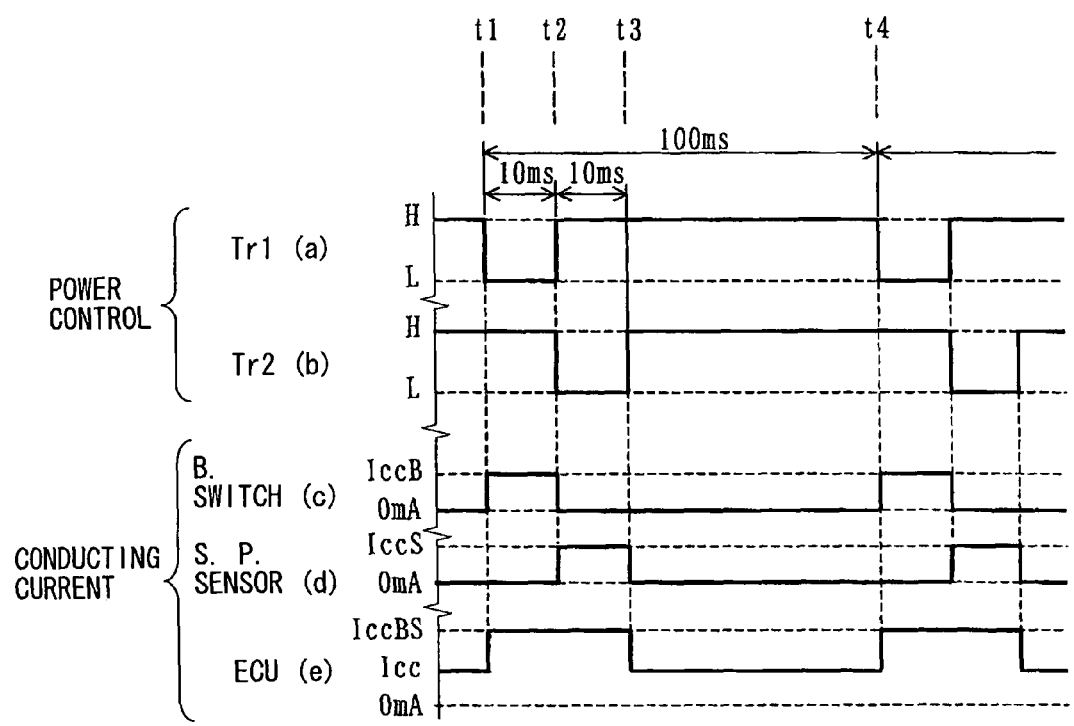
FIG. 3 is a timing chart illustrating timing of power control and conduction current change according to one embodiment.

Through the above-described way, the occupant detection ECU 11 energizes the buckle switch 13 and determines whether the seat belt is fastened or unfastened. Further, the occupant detection ECU 11 energizes the seat position sensor 14 and determines in which position the seat is in. In the present embodiment, each of the buckle switch 13 and the seat position sensor 14 are intermittently energized and operated, as shown in FIG. 3. In this relation, when a voltage having a high (H) level is supplied to the gate terminal, the transistor Tr1, Tr2 is in on off state. When the voltage having a low (L) level is supplied to the gate terminal, the transistor Tr1, Tr2 is in the on state.

As shown in FIG. 3, the voltage "L" is supplied to the gate of the first transistor Tr1 for a predetermined period per a predetermined time interval. For example, the predetermined period is 10 ms and between t1 and t2, and the predetermined time interval is 100 ms and between t1 and t4, as shown in FIG. 3. At a time when the voltage supplied to the gate of the first transistor Tr1 is switched from "L" to "H", the voltage "L" is supplied to the gate terminal of the second transistor Tr2 for a predetermined period of 10 ms between t2 and t3. In the above control, a period of the supply of the voltage "L" to the first transistor Tr1 and that to the second transistor Tr2 have time continuity therebetween.

According to the above control, as shown in FIG. 3, the first transistor Tr1 is in the on state for 10 ms between t1 and t2. Thus, between t1 and t2, the buckle switch 13 is energized and the conduction current IccB flows. Then, the second transistor Tr2 is in the on state for 10 ms between t2 and t3. Between t2 and t3, the seat position sensor is energized and the conduction current IccS flows. Due to the time continuity between the flow of the conduction currents IccB and IccC, the conduction current Icc continuously flows in the occupant detection ECU 11 for 20 ms between t1 and t3. In the above, the conduction current Icc is a conduction current for the buckle switch 13 and the seat position sensor 14. That is, a conduction current IccBS flows in the occupant detection ECU 11 for 20 ms per 100 ms. It should be noted that the conduction current IccBS can be associated with or can become power consumption conduction current Icc in the occupant detection ECU 11.

Figure 4:
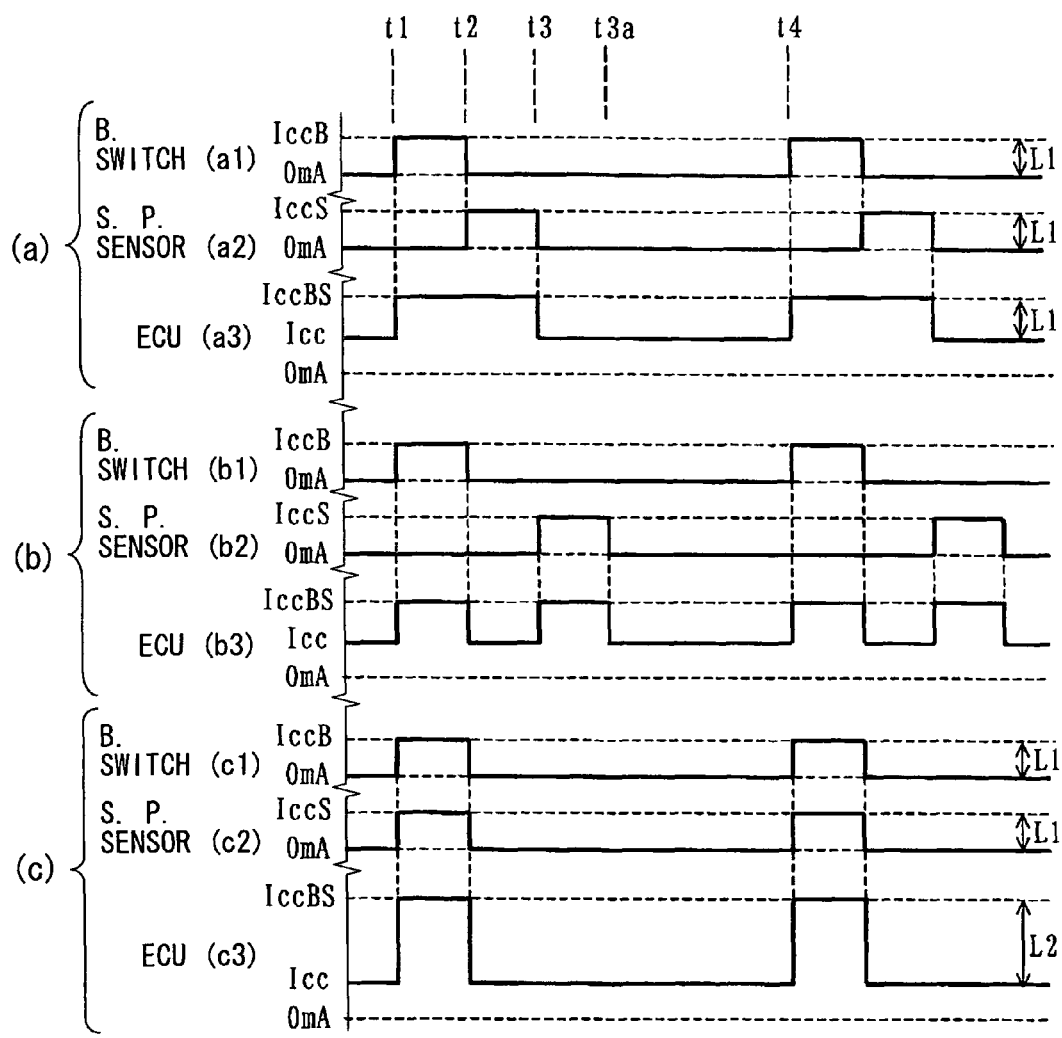
FIG. 4A is a timing chart illustrating timing of power control on a buckle switch and a seat position sensor, and timing of conduction current change according to one embodiment.
FIG. 4B is a timing chart illustrating timing of power control on a buckle switch and a seat position sensor, and timing of conduction current change according to a first comparison example.
FIG. 4C is a timing chart illustrating timing of power control of a buckle switch and a seat position sensor, and timing of conduction current change according to a second comparison example.

An advantage of the present embodiment is described with reference to FIGS. 4A to 4C while the present embodiment is compared to a first comparison example and a second comparison example. FIG. 4A is a timing chart according to the present embodiment. FIGS. 4A and 4B are timing charts according to the first and second comparison examples, respectively. In FIGS. 4A to 4C, it is assumed that a period between t1 and t2, a period between t2 and t3, and a period between t3 and t3 are the same in time length.

According to the first comparison example in FIG. 4B, the buckle switch 13 is in ON and the conduction current IccB flows for 10 ms (between t1 and t2) per 100 ms (between t1 and t4). Then, the seat position sensor is in ON and the conduction current IccS flows for 10 ms between t3 and t3*a* so that there is a time gap between the end of the energization of the buckle switch 13 and the start of the energization of the seat position sensor 14. Accordingly, the pulse conduction current IccBS having a time width of 10 ms flows two times per 100 m in the occupant detection ECU 11 while the two pulses IccBS are time-separated from each other. In this case, a frequent change in the conduction current IccBS disadvantageously causes radio noise generation.

In contrast to the first comparison example, according to the present embodiment, the pulse conduction current IccBS having a time width of 20 ms flows only one time per 100 ms, as shown in FIG. 4A. Accordingly, a change in the conduction current IccB in the occupant detection ECU 11 is minimized, and the radio noise generation is advantageously reduced. The present embodiment can therefore minimize a negative influence of the radio noise on another electronic apparatus mounted in the vehicle.

According to the second comparison example in FIG. 4C, the buckle switch 13 is in ON and the conduction current IccB flows for 10 ms between t1 and t2 per 100 ms (between t1 and t4). During the same period between the t1 and t2, the seat position sensor 14 is in ON and the conduction current flows IccS for 10 ms. Accordingly, although the number of changes in the conduction current IccBS per 100 ms in the occupant detection ECU 11 is small, the conduction current IccB for the buckle switch 13 and the conduction current IccS for the seat position sensor 14 flow during the same period between t1 and t2. In this case, the conduction current IccB having a magnitude L1 and the conduction current IccS having a magnitude L2 are combined into a large conduction current IccBS having magnitude L2=L1+L2. That is, the large conduction current IccBS flows in the occupant detection ECU 11. Accordingly, the radio noise having a large power is disadvantageously generated.

In contrast to the second comparison example, according to the present embodiment, the period when the conduction current IccB for the buckle switch 13 flows and the period when the conduction current IccS for the seat position sensor 14 flows are combined so as to be time separated but have time-continuity therebetween (without a time gap therebetween). Therefore, the conduction current IccBS, which is a combination of IccB and IccS, does not increase in magnitude due to the combination. It is therefore possible to advantageously prevent generation of the radio noise having a large power, and it is possible to eliminate a negative influence of the radio noise on another electronic apparatus mounted in the vehicle.

According to an aspect of the above embodiments, an occupant detection apparatus for a vehicle is provided. The occupant detection apparatus includes: a buckle switch, a seat position sensor, and an electronic control unit. The buckle switch is configured to detect whether a seatbelt of the vehicle is fastened or unfastened. The seat position sensor is configured to detect position of a seat of the vehicle, wherein the seat is selectively movable frontward and rearward. The electronic control unit includes an energization control part and a computation control part. The energization control part includes: a first active element that is selectively switchable into an on state and an off state to control energization of the buckle switch so that the buckle switch is energized when the first active element is in the on state, and the buckle switch is unenergized when the first active element is in the off state; and a second active element that is selectively switchable into an on state and an off state to control energization of the seat position sensor so that the seat position sensor is energized when the second active element is in the on state, and the seat position sensor is unenergized when the second active element is in the off state. The computation control part is configured to perform on-off control individually on the first active element and the second active element by (i) applying a first voltage to the first active element to and (ii) applying a second voltage to the second active element, in such manner that: the computation control part causes the first active element to be in the on state for a predetermined period; and at a time of an end of the predetermined period, the computation control part switches the first active element into the off state and switches the second active element into the on state.

According to the above occupant detection apparatus, when the first active element for the energization of the buckle switch is in the on state, the buckle switch is in an operating state, and a conduction current flows in the buckle switch. When the second active element for the energization of the seat position sensor is in the on state, the seat position sensor is in an operating state, and a conduction current flows in the seat position sensor. Further, the second active element for the energization of the seat position sensor is switched into the on state so that the energization of the buckle switch and that of the seat position sensor have time continuity therebetween. In other words, no time interval is placed between the end of the oh state of the first active element and the start of the on state of the second active element. Since the conduction current for the buckle switch and that for the seat position sensor are combined into a combined conduction current in a time-continuous manner, the combined conduction current flows in the electric control unit at regular time intervals. It should be noted that, if the energization of the buckle switch and that of the seat position sensor were time-separated and do not have the time continuity therebetween, a change in the conduction current flowing in the electronic current would be large. According to the above occupant detection apparatus, in contrast, since the energization of the buckle switch and that of the seat position sensor are provided with time continuity therebetween, a change in conduction current flowing in the electronic current is small, and as a result, it is possible to reduce generation of radio noise. It is therefore possible to minimize a negative influence of the radio noise on another electronic apparatus mounted in the vehicle.

The above occupant detection apparatus may be configured such that the computation control part performs the on-off control, in which the first active element is caused to be in the on state for the predetermined period, at predetermined regular time intervals.

According to the above configuration, since the computation control part performs the on-off control at the predetermined regular time intervals, the on-control performed at the predetermined regular time intervals can be done in an easy manner. It should be noted that, in the first comparison example, the conduction current, which is for the buckle switch and the seat position sensor, flows two times per the regular time interval. In the above configuration, in contrast, the conduction current having a pulse form flows one time per the regular time interval, and thus, a change in the conduction current in the electronic control unit is small and the generation of the radio noise is advantageously reduced.

The above occupant detection apparatus may further include an electrostatic sensor configured to output one of an electric current and a voltage, the one being indicative of disturbance of a weak electric field generated between a main electrode disposed inside the seat and a body of the vehicle. The electronic control unit may further include a sensor characteristic measurement part that is configured to measure an electrostatic capacitance of a measurement target object on the seat based on the one of the electric current and the voltage outputted from the electrostatic sensor.

In some cases, the electrostatic sensor may be sensitive or weak against radio noise, and the radio noise may be a factor for an error detection of the electrostatic sensor. According the above configuration, however, the electronic control unit, which includes the sensor characteristic measurement connected with the electrostatic sensor, is configured not to generate the radio noise. A negative influence of radio noise on the electrostatic sensor can be advantageously minimized.

While the invention has been described above with reference to various embodiments thereof, it is to be understood that the invention is not limited to the above described embodiments and constructions. The invention is intended to cover various modifications and equivalent arrangements. In addition, while the various combinations and configurations described above are contemplated as embodying the invention, other combinations and configurations, including more, less or only a single element, are also contemplated as being within the scope of embodiments.

What is claimed is:

1. An occupant detection apparatus for a vehicle, comprising:
    a buckle switch configured to detect whether a seatbelt of the vehicle is fastened or unfastened;
    a seat position sensor configured to detect position of a seat of the vehicle, wherein the seat is selectively movable frontward and rearward; and
    an electronic control unit including:
        an energization control part including:
            a first active element that is selectively switchable into an on state and an off state to control energization of the buckle switch so that the buckle switch is energized when the first active element is in the on state, and the buckle switch is unenergized when the first active element is in the off state; and
            a second active element that is selectively switchable into an on state and an off state to control energization of the seat position sensor so that the seat position sensor is energized when the second active element is in the on state, and the seat position sensor is unenergized when the second active element is in the off state; and
        an computation control part that is configured to perform on-off control individually on the first active element and the second active element by (i) applying a first voltage to the first active element to and (ii) applying a second voltage to the second active element, in such manner that:
            the computation control part causes the first active element to be in the on state for a predetermined period; and
            at a time of an end of the predetermined period, the computation control part switches the first active element into the off state and switches the second active element into the on state.

2. The occupant detection apparatus according to claim 1, wherein:
    the computation control part performs the on-off control, in which the first active element is caused to be in the on state for the predetermined period, at predetermined regular time intervals.

3. The occupant detection apparatus according to claim 1, further comprising:
    an electrostatic sensor configured to output one of an electric current and a voltage, the one being indicative of disturbance of a weak electric field generated between a main electrode disposed inside the seat and a body of the vehicle,
    wherein the electronic control unit further includes
        a sensor characteristic measurement part that is configured to measure an electrostatic capacitance of a measurement target object on the seat based on the one of the electric current and the voltage outputted from the electrostatic sensor.

* * * * *